United States Patent [19]
Feldmann

[11] Patent Number: 5,599,072
[45] Date of Patent: Feb. 4, 1997

[54] PROCESS AND APPARATUS FOR BRAKING A VEHICLE

[75] Inventor: Joachim Feldmann, Neustadt, Germany

[73] Assignee: WABCO Standard GmbH, Hanover, Germany

[21] Appl. No.: 946,740

[22] Filed: Sep. 17, 1992

[30] Foreign Application Priority Data

Sep. 19, 1991 [DE] Germany .......................... 41 31 169.8

[51] Int. Cl.$^6$ ................ B60T 8/32; B60T 13/66
[52] U.S. Cl. ............... 303/3; 303/15; 303/113.4; 303/155
[58] Field of Search ................... 303/3, 15, 20, 303/91, 113.14, 24.1, 155

[56] References Cited

U.S. PATENT DOCUMENTS

| | | | |
|---|---|---|---|
| 4,418,963 | 12/1983 | Sprockhoff | 303/3 |
| 4,550,372 | 10/1985 | Kahrs | 303/3 |
| 4,598,953 | 7/1986 | Wood et al. | 303/3 |
| 4,671,576 | 6/1987 | Fourie | 303/3 |
| 4,712,839 | 12/1987 | Brearley et al. | 303/3 |
| 4,784,442 | 11/1988 | Petersen | 303/3 |
| 4,962,969 | 10/1990 | Davis | 303/3 |
| 4,978,177 | 12/1990 | Ingraham | 303/15 |

FOREIGN PATENT DOCUMENTS

| | | |
|---|---|---|
| 336046 | 10/1989 | European Pat. Off. . |
| 429066 | 5/1991 | European Pat. Off. . |
| 1018448 | 10/1957 | Germany . |
| 2327508 | 5/1973 | Germany . |
| 2419242 | 4/1974 | Germany . |
| 3502825 | 7/1986 | Germany . |
| 60-045454 | 3/1985 | Japan . |

*Primary Examiner*—Matthew C. Graham
*Attorney, Agent, or Firm*—Meltzer, Lippe, Goldstein et al.

[57] ABSTRACT

A process for braking a vehicle and braking system for carrying out that process are disclosed. As braking begins, a start-braking signal is produced. A signal indicating a vehicle deceleration requirement and a signal indicating the actual vehicle deceleration are also produced. At the time the start-braking signal is produced, a control unit sets an initial vehicle declaration signal equal to the signal indicating the actual vehicle deceleration. Thereafter, the control unit actuates at least one brake of the vehicle when the value of the signal indicating the actual vehicle deceleration is different from the sum of the signal indicating the vehicle deceleration requirement and the initial vehicle deceleration signal.

7 Claims, 1 Drawing Sheet

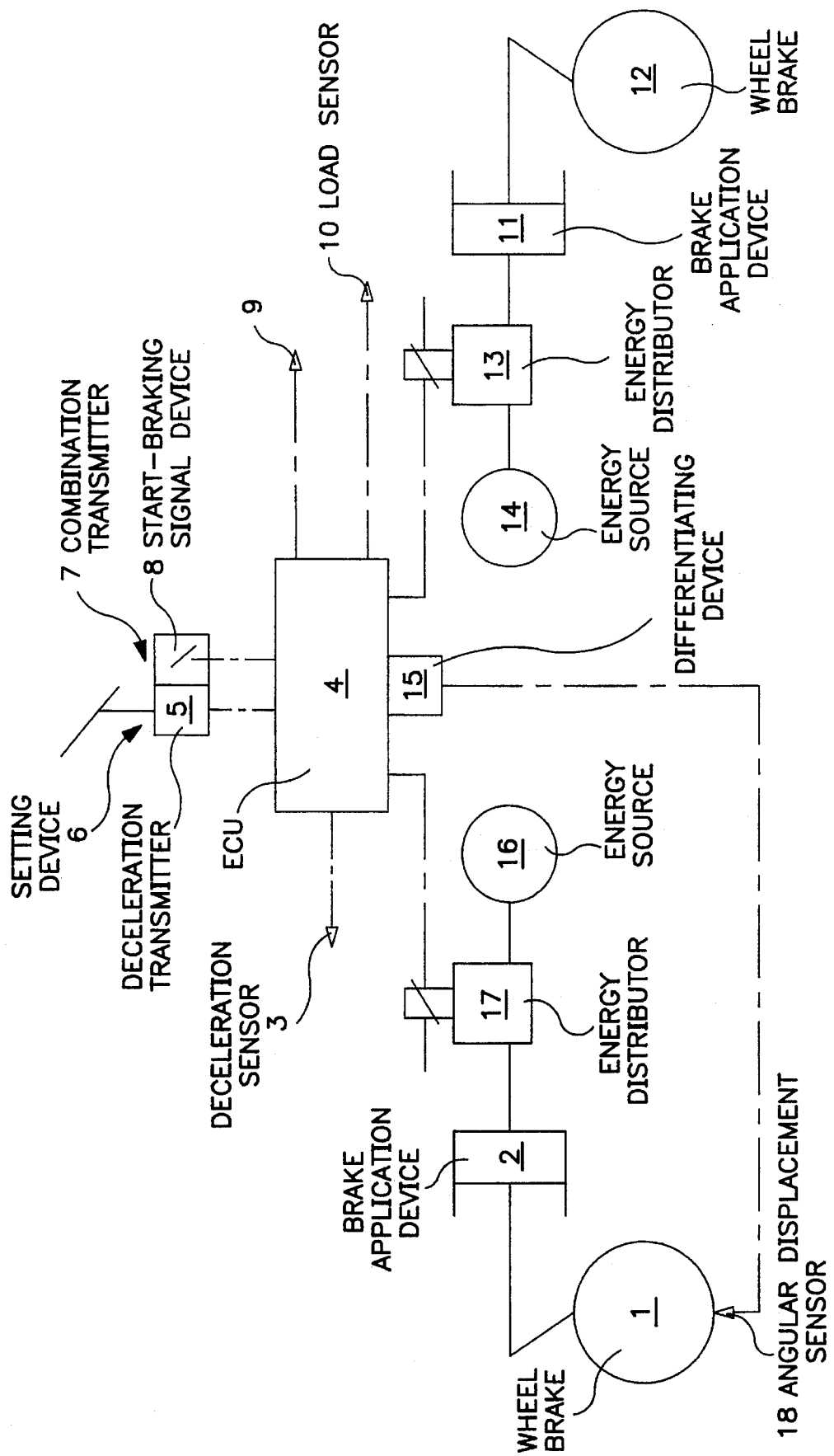

PROCESS AND APPARATUS FOR BRAKING A VEHICLE

BACKGROUND OF THE INVENTION

The invention relates to a process for braking a vehicle and a braking system for carrying out that process.

A process for braking a vehicle is described in DE 35 02 825 A1. A braking device, called a "braking system with regulated deceleration," which functions according to this process, is disclosed in FIG. 2 of this disclosure. In the disclosed braking process, a control unit transmits a brake actuation signal to at least one energy distributor which supplies energy to at least one wheel brake. The energy is supplied so long as a signal which indicates the actual deceleration of the vehicle differs from a signal indicating the required deceleration produced by the driver.

When travelling downhill, the vehicle is subject to a downhill force which accelerates the vehicle, i.e., decelerates it negatively, if it is not braked by other means. When actuating the aforementioned braking system with regulated deceleration, the driver of the vehicle can only produce a vehicle deceleration requirement signal, by means of a deceleration transmitter, for a vehicle deceleration that is other than 0. The control unit then transmits a brake actuation signal until the vehicle deceleration requirement signal equals the signal indicating actual vehicle deceleration transmitted from a deceleration sensing device. This means that a vehicle equipped with the known braking system with regulated deceleration cannot be braked to zero deceleration, i.e., to a constant speed, when travelling downhill.

An object of the present invention is to further develop a process for braking a vehicle in which the vehicle can be simply braked to a constant speed when travelling downhill.

A vehicle equipped with the known braking system also has the disadvantage that it cannot be braked without a jolt on downhill travel. This is because the vehicle is abruptly "yanked over" from accelerated travel to decelerated travel by even the slightest actuation of the braking system, i.e., by even a very small vehicle deceleration requirement signal. This disadvantage is eliminated by the present invention.

When travelling uphill without power and without braking, e.g., when the driver switches from pressing the accelerator pedal to braking, an uphill force slows down the vehicle, resulting in a corresponding signal of the deceleration sensing device indicating the actual vehicle deceleration. When the aforementioned known braking system with regulated deceleration is actuated, the control unit generates no brake actuation signal so long as the driver fails to produce a vehicle deceleration requirement signal for a vehicle deceleration which is greater than the existing vehicle deceleration. Rather, the braking system remains inactive during that time. Hence, the driver actuates the braking system "on idle" and during that time has the sensation that the braking system has failed. This disadvantage is also eliminated by the invention.

With the known braking system with regulated deceleration, the interactions between the driver and the vehicle, when the driver actuates the braking system with a particular actuation force or actuation displacement, are under certain circumstances different from those to which the driver is accustomed for a conventional vehicle equipped with a conventional braking system. Such interactions between the driver and the vehicle include bearing forces exerted by the driver upon the steering wheel, the driver seat, the safety belt, the floor of the driver's cabin, etc.

In a conventional braking system, which is energy, e.g., pressure, regulated, the driver transmits an energy requirement signal by applying a force or displacement to a transmitter. The transmitter in turn causes appropriate energy regulation devices to apply the appropriate amount of braking corresponding to that signal.

The driver of a vehicle equipped with a conventional braking system becomes accustomed to the correlation between the above-mentioned interactions and the resulting vehicle deceleration. When travelling uphill without power and without braking, the uphill deceleration force thus acts upon the vehicle and thereby upon the driver who is unaware of any interaction with the vehicle. Only the additional vehicle deceleration caused by an actuation of the braking system makes the driver feel interactions. To the driver, these interactions are no different from those occurring when the braking system is actuated on flat ground. Similarly, when the vehicle travels downhill without power and without braking, the accelerating downhill force acts upon the vehicle and the driver without producing any driver awareness of interaction with the vehicle. In this case too, the driver becomes accustomed to the "learned correlations" when actuating the brake. This lack of awareness to interactions also applies for braking when the downhill force exceeds the braking force so that vehicle and driver accelerate in spite of the actuation of the braking system.

In a vehicle equipped with the known braking system with regulated deceleration, the deceleration sensing device produces a signal indicating actual vehicle deceleration when travelling uphill without power and without braking. This actual vehicle deceleration signal corresponds to the vehicle deceleration caused by the uphill deceleration force. If the driver now actuates the braking system, the control unit therein causes only so much brake energy to be applied at the wheel brake as is required to cancel out the difference between the signal indicating actual vehicle deceleration (which is based on the uphill decelerating force) and the vehicle deceleration requirement signal. The driver senses only interactions based on this additional deceleration. Thus, the driver has the sensation that the braking system is failing when driving uphill. On the other hand, when actuating the braking system while travelling downhill without power or brake, the driver detects interactions which, in addition to those corresponding to the vehicle deceleration requirement signal, are based on the neutralization of the pre-braking accelerating downhill force. For this reason, the driver has the sensation when driving downhill that his braking system is very good.

Different interactions not only reduce the driver's comfort but also impede the driver's ability to develop a sensitivity to the dependency between actuating force or actuating displacement and the resulting vehicle deceleration. As a consequence, it is difficult for the driver to detect any possible defects in the braking system from its behavior.

Hence, a further object of the present invention is to eliminate the above-described disadvantages or differences in interactions occurring when the different braking systems are actuated. Any changes occurring with respect to the normal interactions experienced while actuating the braking system according to the invention, indicate a malfunction in the electrical components of the braking system.

SUMMARY OF THE INVENTION

These and other objects are achieved by the present invention which provides a process for braking a vehicle. As braking begins, a start-braking signal is produced. A signal indicating a vehicle deceleration requirement and a signal indicating the actual vehicle deceleration are also produced. At the time the start-braking signal is produced, a control unit sets an initial vehicle deceleration signal equal to the signal indicating the actual vehicle deceleration. Thereafter, the control unit actuates at least one brake of the vehicle when the value of the signal indicating the actual vehicle deceleration is different from the sum of the signal indicating the vehicle deceleration requirement and the initial vehicle deceleration signal.

BRIEF DESCRIPTION OF THE DRAWING

The drawing shows a schematic diagram of an embodiment of the invention. In the drawing, the energy circuit connections are represented by solid lines and the signal circuit connections by dash-dot lines.

DETAILED DESCRIPTION OF THE INVENTION

The braking system in the basic embodiment comprises an electronic deceleration transmitter 5, an electronic start-braking signal device 8, an electronic control unit 4, an electronic deceleration sensing device 3 or 15,18 and a braking circuit 1,2,16,17. The outputs of the deceleration transmitter 5, of the start-braking signal device 8, and of the deceleration sensing device 3, or 15,18 are connected to inputs of the control unit 4.

The braking circuit 1,2,16,17 comprises an energy source 16, an energy distributor 17, a brake application device 2 and a wheel brake 1. The energy source 16 makes energy available at an energy level called "storage energy".

The braking circuit can be designed for any suitable type of energy. For example, pressure or electrical energy may be used. If pressure is used, an appropriate gaseous pressure medium, e.g., compressed air or a fluid pressure medium, can be used as the energy carrier. In this case, the energy source 16 can be a pressure generator or a pressure medium reservoir supplied by a pressure generator, the energy distributor 17 can be a valve arrangement, e.g., a suitable anti-lock valve, and the brake application device 2 can be a brake cylinder.

The electrically actuated energy distributor 17 is connected on the one hand to the energy source 16 and on the other hand to the brake application device 2. Its electrical actuating device is connected to an output of the control unit 4. Upon receiving a brake actuation signal for applying brakes from the control unit, the energy distributor 17 supplies energy to the brake application device 2 from the energy source 16. In this manner, brake application energy builds up, or existing brake application energy increases, in the brake application device 2. The greatest value that this brake application energy can reach is the storage energy. When a brake application signal is received from the control unit 4 for brake release, the energy distributor 17 lets the brake application energy drop in part or completely depending on the duration of this brake actuation signal. If air is used as the pressure medium, the drop in brake application energy is normally accompanied by an exhaust into the atmosphere.

The deceleration transmitter 5 is actuated by the driver by means of a setting device 6 which normally includes a pedal component. When actuated, the deceleration transmitter 5 produces a vehicle deceleration requirement signal having a value which depends on the magnitude of the actuating force brought to bear on, or the actuating displacement of, the setting device 6. Any suitable electrical braking power transmitter can be sued as the deceleration transmitter 5.

The deceleration sensing device 3 or 15,18 detects the existing vehicle deceleration of the vehicle equipped with the inventive braking system and produces a corresponding signal indicating the actual vehicle deceleration. Any suitable device can be used as the deceleration sensing device. Two variants are shown in the embodiment illustrated in the drawing. In the first variant, the deceleration sensing device 3 comprises a sensor which evaluates the transverse vehicle speed. The second variant of the deceleration sensing device 15,18 utilizes an angular displacement sensor 18 associated with the vehicle wheel assigned to the wheel brake 1 and a differentiating device 15. The differentiating device 15 differentiates the signal from the angular displacement sensor twice with respect to time thereby forming the actual vehicle deceleration signal from the signal transmitted from the angular displacement sensor. A person skilled in the art is familiar with the circuitry of the electrical components which can be used in such a differentiating device. The differentiating device 15 is shown attached to the control unit 4 because it is customary to integrate such differentiating devices into other electronic components. The second variant of the deceleration sensing device 15, 18 is especially advantageous for use in a vehicle which is also equipped with an anti-lock braking system. This is because both angular displacement sensors and differentiating devices of the type employed in this invention are used in the technology of anti-lock braking systems.

The start-braking signal device 8 is actuated by the driver before the deceleration transmitter 5 transmits the vehicle deceleration requirement signal. Any suitable device can be used as the start-braking signal device 8. However, it is advantageous and simple to combine structurally the start-braking signal device 8 with the deceleration transmitter 5. The start-braking signal device 8 can then be co-actuated with the setting device 6 of the deceleration transmitter 5. The component formed by the two transmitters is shown as a combination transmitter 7. In the drawing, the start-braking signal device 8 is shown as a switch which produces the start-braking signal by closing or opening an electric circuit which is partially located in the control unit 4.

Conventional electronic components are interconnected in the control unit 4 in a known manner so that the control unit 4 functions as described below. For example, the control unit 4 may include a microprocessor which is programmed to carry out the described functions.

To actuate the braking system, the driver acts upon the setting device 6 and thereby upon the combination transmitter 7. In this manner, the driver first produces the start-braking signal by means of the start-braking signal device 8. Then, the deceleration transmitter 5 produces a vehicle deceleration requirement signal having a value determined by the actuating force exerted upon, or the actuating displacement of, the setting device 6.

Upon receiving the start-braking signal, the control unit 4 detects the signal indicating actual vehicle deceleration produced at that moment by the deceleration sensing device 3 or 15,18. This detected signal indicating actual vehicle deceleration is stored as the signal indicating the initial vehicle deceleration, e.g., by means of buffer storage. The vehicle deceleration requirement signal is then received at the control unit 4 where it is added to the signal indicating the initial vehicle deceleration. The control unit 4 then transmits a brake actuation signal for brake application. In response to the brake actuation signal, the energy distributor 17 connected to the brake application device 2 supplies energy. As a result, a brake application energy builds up in the brake application device 2 resulting in the production of a corresponding braking force by the wheel brake 1 and, thereby, in a corresponding vehicle deceleration. The deceleration sensing device 3 or 15,18 measures this vehicle deceleration and produces a corresponding signal indicating actual vehicle deceleration. The brake application energy and hence the braking force, and thereby the vehicle deceleration, may become so great that the signal indicating actual vehicle deceleration is equal to the aforementioned sum of the signal indicating initial vehicle deceleration and the vehicle deceleration requirement signal generated by the driver. In such a case, the control unit 4 switches the brake actuation signal to a brake maintenance signal thereby causing the energy distributor 17 to interrupt the supply of energy to the brake application device 2 and maintain the existing brake application energy. The vehicle is now braked with the desired vehicle deceleration as determined, by the driver, by means of the vehicle deceleration requirement signal.

If for any reason while the vehicle deceleration requirement signal remains unchanged, the vehicle deceleration (as measured by the signal indicating actual vehicle deceleration) decreases, the control unit 4 switches once again back to transmitting the brake actuation signal for brake application. This signal is transmitted until the signal indicating actual vehicle deceleration (which changes by virtue of the increase of brake application energy in the brake application device 2, the increase resulting from the brake actuation signal) again equals the sum of the initial vehicle deceleration signal and the vehicle deceleration requirement signal generated by the driver. If, on the other hand, the signal indicating actual vehicle deceleration increases for any reason during brake actuation while the vehicle deceleration requirement signal remains unchanged, the control unit 4 switches from transmitting the brake maintenance signal to transmitting the brake actuation signal for brake release. In response, the energy distributor 17 permits the brake application energy to decrease until the signal indicating actual vehicle deceleration equals the sum of the initial vehicle deceleration signal and the vehicle deceleration requirement signal generated by the driver. If the driver wishes to terminate the actuation of the brake or wishes to decrease the vehicle deceleration, he releases the setting device 6 or reduces the actuating force thereupon, or the actuating displacement thereof. The control unit 4 then switches to transmitting the brake actuation signal for brake release until the energy of the brake application device 2 is completely released or until the signal indicating actual vehicle deceleration equals the now applicable sum of the signal indicating initial vehicle deceleration and the vehicle deceleration requirement signal.

Following this basic explanation of the functioning of the braking system, an example will be described wherein it is assumed that the vehicle travels downhill with an acceleration (i.e. with negative vehicle deceleration) of 0.1 g. The deceleration sensing device 3 or 15,18 thus produces a signal indicating actual deceleration of −0.1 g. If the driver now actuates the braking system, the control unit 4 detects this signal indicating actual vehicle deceleration and stores it as a signal indicating the initial vehicle deceleration. If the driver now wishes to brake in order to attain a constant speed he must produce a vehicle deceleration requirement signal for a vehicle deceleration of +0.1 g by means of the deceleration transmitter 5. The control unit 4 then adjusts the brake application energy in the brake application device 2 by means of the brake actuation signal, and, if necessary, by means of the brake maintenance signal, so that a signal indicating actual deceleration of −0.1 g+0.1 g=0 is generated thereby producing a constant speed. The braking system thus enables the vehicle to travel downhill at a constant speed even though the deceleration transmitter is only able to transmit a vehicle deceleration requirement signal for a vehicle deceleration that is other than 0.

It shall now be assumed that the driver does not wish to slow down the vehicle to a constant speed as he travels downhill but instead desires to reduce the existing vehicle acceleration from 0.1 g to, e.g., 0.05 g. This is also possible with the braking system according to the present invention. To that end, the driver must produce a vehicle deceleration requirement signal for a vehicle deceleration of +0.05 g by means of the deceleration transmitter 5. The control unit 4 then adjusts the brake application energy in the brake application device 2 so that the deceleration sensing device 3 or 15,18 produces a signal indicating actual vehicle deceleration of −0.1 g+0.05 g=−0.05 g. This example illustrates the fine tuning which is possible with the braking system and thus its capability to brake the vehicle during downhill travel without jolts.

It shall now be assumed that the vehicle is travelling uphill and is slowed down by an uphill deceleration force of +0.1 g. If the driver now wishes to increase the deceleration of the vehicle, e.g. by +0.05 g, he produces a vehicle deceleration requirement signal for a vehicle deceleration of 0.05 g. The control unit 4 then adjusts the brake application energy in the brake application device 2 by means of the brake actuation signal, and, if necessary, by means of the brake maintenance signal, so that the deceleration sensing device 3 or 15,18 produces a signal indicating actual vehicle deceleration of +0.1 g+0.05 g=0.15 g. This example shows that the braking system ensures a finely controlled increase of the vehicle deceleration, without "idle" actuation during uphill travel.

The driver senses the same interaction effects in the examples discussed above as when the same vehicle deceleration requirement signal is produced while driving on a flat road.

Because of its above-described actions, the braking system according to the invention provides a process for braking a vehicle with the previously mentioned advantages (among other advantages).

The drawing shows a possible further development of the basic embodiment described above in the form of a second braking circuit 11,12,13,14. The second braking circuit 11,12,13,14 includes an energy source 14, an energy distributor 13, a brake application device 11 and a wheel brake 12 which are actuated and act in the same manner as the corresponding components of the braking circuit 1,2,16,17 of the basic embodiment. Additionally, both braking circuits may have several wheel brakes available. Furthermore, each wheel brake can be assigned its own brake application device, or all of the wheel brakes can be assigned a common brake application device. If several brake application devices are provided, a common energy distributor can be assigned to all of the brake application devices or a separate energy distributor can be assigned to each brake application device. It is also possible to organize the total number of brake application devices into groups, where each group is assigned an energy distributor. Angular displacement sensors assigned to a wheel of the second braking circuit 11,12,13,14 can also be part of the deceleration sensing device in a manner not shown in the drawing.

Angular displacement sensors on several wheels can also form part of the deceleration sensing device, the signals from these sensors being averaged by the differentiation device 15 before differentiation takes places. Alternatively, the differentiation device 15 can form the actual vehicle deceleration signal from these signals in a different manner, for which the control unit 4 can be equipped with priority circuits or averaging circuits.

Another further development is shown in the drawing in the form of a load sensor 10 which transmits a signal to an input of the control unit 4. In such a case, the control unit 4 can be further optimized so that it distributes braking energy, as a function of load distribution, over the shown brake application devices 2, and 11 or additional brake application devices of other braking circuits which may be present.

As a further development possibility, the control unit 4 may take into account additional vehicle parameters in distributing braking energy over the brake application devices. In the drawing, an additional sensor 9 is provided for monitoring additional parameters. Such parameters could be wheel braking temperatures, wear values, effects from a continuous braking system, etc.

The braking system described above can interact with, or be integrated within, an anti-lock braking system device in a manner not shown.

Finally, the aforementioned embodiments are intended to be illustrative. Numerous other embodiments may be devised by those with ordinary skill in the art without departing from the scope of the following claims.

I claim:

1. A process for controlling the braking of a travelling vehicle comprising the steps of:

producing a start-braking signal as braking begins, producing a signal indicating a vehicle deceleration requirement, producing a signal indicating actual vehicle deceleration, setting an initial vehicle deceleration signal equal to said signal indicating actual vehicle deceleration produced at the time said start-braking signal is produced, and actuating at least one brake of said vehicle when the value of said signal indicating actual vehicle deceleration is different from the sum of said signal indicating a vehicle deceleration requirement and said initial vehicle deceleration signal.

2. The process of claim 1 wherein said signal indicating actual vehicle deceleration is determined from the angular displacement of a vehicle wheel.

3. A braking system for actuating at least one brake on a travelling vehicle, comprising:

means for producing a start-braking signal as braking begins, means for producing a signal indicating actual vehicle deceleration, means for producing a signal indicating a vehicle deceleration requirement, and control means responsive to said start-braking signal, said signal indicating actual vehicle deceleration and said signal indicating a vehicle deceleration requirement for setting an initial vehicle deceleration signal equal to said signal indicating actual vehicle deceleration produced at the time said start-braking signal is produced and for actuating said at least one brake when the value of said signal indicating actual vehicle deceleration is different from the sum of said signal indicating a vehicle deceleration requirement and said initial vehicle deceleration signal.

4. The braking system of claim 3 wherein said means for producing a signal indicating actual vehicle deceleration comprises an angular displacement sensor which senses the angular displacement of a vehicle wheel.

5. The braking system of claim 4 wherein said means for producing a signal indicating actual vehicle deceleration further comprises a differentiation device which differentiates the angular displacement of a vehicle wheel sensed by said angular displacement sensor.

6. The braking system of claim 3 wherein said means for producing a start-braking signal and said means for producing a signal indicating a vehicle deceleration requirement are each part of a combination transmitter which produces said start-braking signal prior to producing said vehicle deceleration requirement signal when said combination transmitter is actuated.

7. The braking system of claim 3, wherein said braking system further comprises at least one braking circuit having:

a brake application device for each at least one brake, an energy source, and at least one energy distributor connected to said energy source, to at least one brake application device and said control means, wherein said control means transmits a brake actuation signal to said energy distributor to control the supply of energy from said energy source to said at least one brake application device.

* * * * *